(12) United States Patent
Rehg et al.

(10) Patent No.: US 6,245,214 B1
(45) Date of Patent: Jun. 12, 2001

(54) ELECTRO-CATALYTIC OXIDATION (ECO) DEVICE TO REMOVE CO FROM REFORMATE FOR FUEL CELL APPLICATION

(75) Inventors: Timothy J. Rehg, Rancho Palos Verdes, CA (US); Di-Jia Liu, Naperville, IL (US); James C. Williams; Mark Kaiser, both of Arlington Heights, IL (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/393,103

(22) Filed: Sep. 9, 1999

Related U.S. Application Data
(60) Provisional application No. 60/100,990, filed on Sep. 18, 1998.

(51) Int. Cl.[7] ................................................. B01D 53/32
(52) U.S. Cl. ........................................... 205/764; 205/763
(58) Field of Search ..................................... 205/763, 764

(56) References Cited

U.S. PATENT DOCUMENTS

| | | |
|---|---|---|
| 3,884,838 | 5/1975 | Fleming et al. . |
| 4,711,828 | 12/1987 | Ishida et al. . |
| 4,743,276 | 5/1988 | Nishida et al. . |
| 4,910,099 | 3/1990 | Gottesfeld . |
| 5,211,984 | 5/1993 | Wilson . |
| 5,215,729 | 6/1993 | Buxbaum . |
| 5,271,916 | 12/1993 | Vanderborgh et al. . |
| 5,316,747 | 5/1994 | Pow et al. . |
| 5,432,021 | 7/1995 | Wilkinson et al. . |
| 5,482,680 | * 1/1996 | Wilkinson et al. ................... 422/177 |
| 5,531,809 | 7/1996 | Golden et al. . |
| 5,702,839 | 12/1997 | Frost et al. . |
| 5,804,325 | 9/1998 | Yepez ..................................... 429/13 |

FOREIGN PATENT DOCUMENTS

| | | |
|---|---|---|
| 196 15 562 | 10/1997 | (DE) . |
| 02311302 | * 12/1990 | (JP) . |

OTHER PUBLICATIONS

Gasteiger, H.A. et al., $H_2$ and CO electrooxidation on well–characterized Pt, Ru and Pt–Ru, 1995, J. Phys. Chem., 99, 8290–8301 (no month).

Zawodzinski, Jr., Thomas A. et al., Aspects of CO Tolerance in Polymer Electrolyte Fuel Cells: Some Experimental Findings, Electrochemical Society Spring Meeting: Montreal, Canada, May 1997: vol. 97–1.

Patent Abstracts of Japan, vol. 015, No. 100, Mar. 11, 1991; Publication No. JP 02 311 302 A, published Dec. 26, 1990.

* cited by examiner

Primary Examiner—Arun S. Phasge
(74) Attorney, Agent, or Firm—William J. Zak, Jr. Esq.

(57) ABSTRACT

A method and apparatus removes carbon monoxide from hydrogen rich fuel by means of a catalytic material that preferentially adsorbs with carbon monoxide. The catalytic material is regenerated by an oxidizing agent that reacts with the carbon monoxide absorbed by the catalytic material. The reaction is initiated by an electrical current is generated either galvanically or electrolytically through the catalytic material.

36 Claims, 5 Drawing Sheets

ELECTRO-CATALYTIC OXIDATION (ECO) DEVICE TO REMOVE CO FROM REFORMATE FOR FUEL CELL APPLICATION

CROSS-REFERENCE TO RELATED APPLICATIONS

This application is based upon U.S. Provisional patent application No. 60/100,990, filed Sep. 18, 1998.

BACKGROUND OF THE INVENTION

This invention relates to carbon monoxide removal from a hydrocarbon reformate fuel. More specifically, it relates to apparatus and methods that use a catalytic material to adsorb carbon monoxide and an electrical current to initiate a chemical reaction between an oxidizing agent and carbon monoxide that has been adsorbed by the catalytic material, thereby regenerating the material.

The internal combustion engine found in most cars and trucks burns a hydrocarbon fuel such as diesel or gasoline to drive pistons or rotary mechanisms by the force of the expanding gas. Many electrical power plants burn fossil fuel to produce electrical energy through combustion turbines. These processes suffer from a number of limitations. They are inefficient because of the intrinsic limit of the thermodynamic principles involved. Burning of fossil fuel is oftentimes incomplete and produces harmful byproducts such as carbon monoxide, nitrogen oxides and various hydrocarbons in the emissions, which have resulted in environmental pollution. In addition, there is a growing awareness that we are rapidly depleting the non-renewable energy resources on this planet. This, in turn, has led to concerns about the reduction of energy consumption by increasing efficiency and utilizing renewable energy resources.

Fuel cells convert the chemical energy in the fuel directly into electrical energy through an electrochemical reaction. Because they do not operate on the principle of gas expansion through combustion, they do not suffer the same limitations of thermodynamic efficiency commonly found in automobile engines and steam turbines. Accordingly, it is possible for fuel cells to achieve a level of efficiency far greater than that seen in most traditional industrial processes. Additionally, fuel cells make it possible for fuel processors to use renewable forms of energy such as methanol and ethanol, thereby conserving the limited fossil fuel resources of the planet. Moreover, because of the operating environment of a fuel processor and fuel cell, hydrocarbon, nitrogen oxide and carbon monoxide emissions are negligible, approaching a zero emission state.

While there are several types of fuel cells existing in practice, this invention is targeted mainly for applications in polymer electrolyte fuel cells (PEFCs) which are also known as proton exchange membrane fuel cells (PEMFCs). A very efficient PEFC uses pure hydrogen for fuel and oxygen for an oxidant. Pure hydrogen, however, has traditionally been difficult to handle and relatively expensive to store and distribute. Consequently, attempts have been made to use hydrogen rich gas mixtures obtained from reforming of various hydrocarbon fuels. To obtain a convenient and safe source of hydrogen for the fuel cells, on-board reforming of hydrocarbon based fuels, such as gasoline and methanol, is expected to be utilized. However, these fuels usually contain nitrogen, carbon dioxide, and low levels of carbon monoxide in the range from 100's of ppm to a few percent. While the presence of carbon dioxide generally has little effect on the efficient operation of a fuel cell, even relatively low concentrations of carbon monoxide can degrade fuel cell performance. The degradation results from the carbon monoxide chemically adsorbing over the active sites in the electrode of the fuel cell. Thus, the removal of carbon monoxide from fuel has become a major concern in the advancement of PEFC technology.

Prior attempts to remove carbon monoxide from a gas mixture include a pressure swing adsorption method disclosed in Nishida et al., U.S. Pat. No. 4,743,276. They disclose a method for selectively absorbing carbon monoxide by means of Cu(l) disposed on a zeolite support, including the step of adiabatically compressing a gas mixture in the pressure range of 0.5 kg/cm$^2$ to 7 kg/cm$^2$. Golden et al., U.S. Pat. No. 5,531,809 disclose a vacuum swing method as a variation of the pressure swing method disclosed in Nishida. A solid absorbent is selected which physically absorbs carbon monoxide under pressure. When the pressure is reduced to the range of approximately 20 to 100 torr, the carbon monoxide is released from the solid absorbent. By cyclically repeating this process, carbon monoxide may be removed from a gas.

There are, however, multiple limitations to applying the pressure swing adsorption method to fuel cell applications. Firstly, bulky and expensive pressure resistant tanks, as well as pressure and vacuum pump apparatus, are required to carry out the process. The parasitic weight and volume of these devices make it extremely difficult to apply the pressure swing adsorption method for transportation applications such as a fuel cell power plant for an automobile. A second disadvantage of this approach is the significant power expenditure necessary to cycle the pressurization and depressurization steps. This additional power consumption will result in the reduction of overall efficiency of the fuel cell system. Yet another disadvantage of this process is that the toxic carbon monoxide released from desorption has to be converted to carbon dioxide with additional process steps and equipment.

Another prior art process has been referred to as preferential catalytic oxidation (PROX) of carbon monoxide which was documented in U.S. Pat. No. 5,271,916 by Vanderborgh et. al. In the PROX process, a small amount of pure oxygen or air is mixed into the reformate fuel before it enters a one—or multiple stage catalytic reactor. The catalyst in the reactor, which usually contains dispersed precious metals such as platinum, ruthenium, iridium, etc., preferentially reacts with carbon monoxide and oxygen to convert them to carbon dioxide. Due to the limited selectivity, however, more than a stoichiometric amount of oxygen is needed to reduce carbon monoxide to an acceptable level. Also, the excess oxygen will oxidize the hydrogen in the reformate fuel. Even with the PROX process, the concentration of CO in the reformate stream is often still significantly higher than the desirable level for sustainable PEFC operation. Furthermore, the carbon dioxide in the reformate may be converted to carbon monoxide through a reversed water-gas shift reaction inside of the fuel cell.

To further eliminate residual carbon monoxide that escapes from the pretreatment or forms from the reversed water-gas-shift reaction inside of the fuel cell, a direct oxygen injection to fuel cell method was developed. For example, Gottesfeld, U.S. Pat. No. 4,910,099 discloses a method of injecting a stream of oxygen or air into the hydrogen fuel so as to oxidize the carbon monoxide. Pow et al., U.S. Pat. No. 5,316,747 disclose a similar means of eliminating carbon monoxide directly by introducing pure oxygen or an oxygen containing gas along the latter portion of a reaction chamber in an isothermal reactor in the presence of a catalyst that enhances the oxidation of the carbon monoxide. Wilkinson et al., U.S. Pat. No. 5,482,680 disclose the removal of carbon monoxide from a hydrogen fuel for a fuel cell by means of introducing a hydrogen rich reactant stream into a passageway having an inlet, an outlet and a catalyst that enhances the oxidation of carbon monoxide; introducing a first oxygen containing gas stream into the hydrogen rich reactant stream through a first port along the passage way, thereby oxidizing some of the carbon monoxide within the reactant stream; and introducing a second oxygen containing gas at a subsequent point, further oxidizing the remaining carbon monoxide. Wilkinson et al., U.S. Pat. No. 5,432,021 similarly oxidize carbon monoxide to carbon dioxide by means of an oxygen containing gas introduced into a hydrogen rich reactant stream in the presence of an unspecified catalyst.

There are several significant limitations for the PROX process and oxygen injection process. One of these limitations is the parasitic consumption of hydrogen. Due to the limited selectivity, the oxidant injected into a hydrogen rich fuel is always higher than the stoichiometric amount necessary for oxidizing the carbon monoxide. The unreacted oxygen will consume hydrogen in the stream to therefore reduce the overall fuel efficiency. Another significant limitation of these methods is their poor tolerance towards the variation of CO input level in the reformate. To minimize the parasitic hydrogen loss, the oxygen to CO ratio has to be kept at a relatively low level in both approaches. Yet, the CO input level often varies as the result of change of the fuel cell power output and, thus, the reformate throughput. It is difficult to constantly match the CO input level with the oxygen level in a dynamic environment. Consequently, unreacted CO will exceed the fuel cell tolerance level, leading to poor performance. Yet another limitation of these two approaches is the concern over safety. The oxygen to hydrogen ratio in the mixture has to be strictly controlled below the explosion threshold.

Another prior art process for removing carbon monoxide involves membrane separation, whereby the hydrogen in the reformate can be separated by a metallic membrane. For example, R. E. Buxbaum, U.S. Pat. No. 5,215,729 discloses a palladium based metallic membrane which provides the selectivity for hydrogen separation up to 100%. Therefore, it could remove carbon monoxide and other components from hydrogen which is the fuel for the PEFC. Although highly selective, the process has several disadvantages. Since it uses precious metal as membrane material, it is expensive. Furthermore, the reformate has to be pressurized to facilitate the separation process which results in parasitic power loss and equipment complexity.

Methanization is another prior art process to remove carbon monoxide through the catalytic reaction of carbon monoxide with hydrogen to form methane. An example of this method is given by Fleming et. al., U.S. Pat. No. 3,884,838. Methane does not have a detrimental impact and is regarded as non-reactive in the fuel cell. The methanation reaction, however, requires hydrogen as a reactant and, therefore, increases the parasitic consumption of the fuel for the fuel cell. Furthermore, under the methanation condition, not only carbon monoxide but also carbon dioxide participates in the reactions. The reaction of carbon dioxide with hydrogen generates carbon monoxide through chemical equilibrium. It is therefore difficult to reduce the carbon monoxide level to the desirable limit for PEFC operation.

Because of the sensitive nature of fuel cells, it is vital that carbon monoxide removal approaches 100% efficiency. In addition to the process limitations, such as cost, excess volume and weight, system complexity and high parasitic hydrogen consumption for the above mentioned methods, there is another common shortcoming, i. e., slow response during the cold start of the fuel cell power plant. Most of these approaches need the system to reach a certain temperature before they are operable, which often represents an undesirable delay between start-up and normal operation.

Therefore, there is a need for a method of removing carbon monoxide from a hydrocarbon reformate that is highly efficient, displays enhanced tolerance to carbon monoxide concentration swings, reduces parasitic hydrogen consumption, eliminates venting of carbon monoxide into the atmosphere, can be operated simply and economically, and can operate at the temperature and pressures of a fuel cell, as well as during the start-up mode.

SUMMARY OF THE INVENTION

In the present invention, an electrocatalytic oxidation (ECO) processor for removing carbon monoxide from a hydrocarbon reformate comprises a cell containing a electrode catalytic material that preferentially adsorbs and reacts with carbon monoxide. An oxidizing agent that reacts with the carbon monoxide absorbed by the catalytic material, typically converting the carbon monoxide to carbon dioxide, regenerates an adsorption capacity of that catalytic material. Electrical leads disposed on opposite sides of a proton permeable membrane electrode assembly form a circuit capable of discharging a current through the catalytic material, thereby triggering the regeneration process. The circuit may be galvanic in nature, or comprised of a separate D.C. power supply.

A carbon monoxide removal system according to the present invention comprises a fuel processor that processes a hydrocarbon fuel containing carbon monoxide; an electrocatalytic oxidation processor downstream of the fuel processor which is capable of removing carbon monoxide from the fuel by means of a catalytic material that preferentially adsorbs carbon monoxide; and an electrical circuit that produces an electrical current through the catalytic material, thereby converting the carbon monoxide to carbon dioxide through electro-catalytic oxidation and regenerating the catalytic material.

A method for removing carbon monoxide from a hydrocarbon reformate according to this invention comprises the steps of humidifying the reformate; moving the humidified reformate across an electrode catalytic material that preferentially adsorbs carbon monoxide; and producing an electrical current through the catalytic material which triggers a reaction between the adsorbed water as well as the oxidizing species formed from water during the electrochemical process with the carbon monoxide, thereby converting the carbon monoxide to carbon dioxide and regenerating the catalytic material.

These and other features, aspects and advantages of the present invention will become better understood with reference to the following drawings, description and claims.

BRIEF DESCRIPTION OF THE DRAWINGS

FIG. 2b depicts a bipolar plate that can be used on anode and cathode sides of the MEA shown in FIG. 2a;

DETAILED DESCRIPTION OF THE INVENTION

Figure 1:
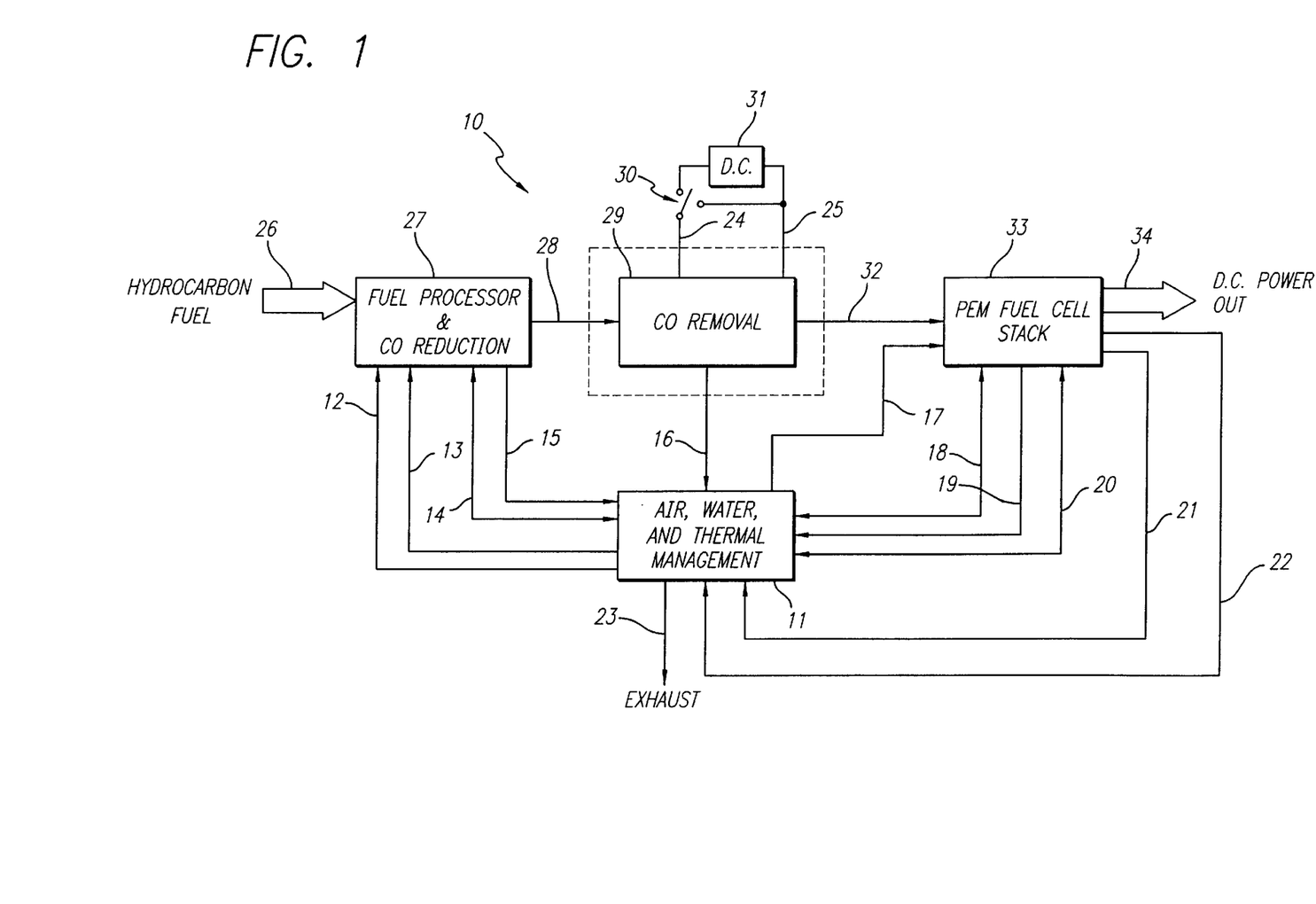
FIG. 1 discloses a block diagram of a method and apparatus for removing carbon monoxide from a fuel according to one embodiment of the present invention.

FIG. 1 is a block diagram disclosing the various component parts of one embodiment of a method and a power generation system 10 for removing carbon monoxide from a hydrocarbon fuel and producing D.C. power according to the present invention. In general, a hydrocarbon fuel source 26, such as gasoline, natural gas or methanol, is introduced into a fuel processor 27. In the fuel processor 27, the hydrocarbons can react with air or water through partial oxidation or steam reforming to form a reformate mixture containing hydrogen, carbon monoxide, carbon dioxide, water and other minor components. The reformate mixture usually undergoes additional steps of catalytic reactions, such as a water-gas-shift reaction, to further promote the reaction between steam and CO to form hydrogen and $CO_2$.

Upon exiting the fuel processor 27, a hydrogen rich reformate 28 containing a small amount of carbon monoxide (usually less than a few percent) enters an electro-catalytic oxidation (ECO) cell or processor 29 where carbon monoxide is removed from the reformate 28. A carbon monoxide free reformate 32 exits from the ECO processor 29 and enters a fuel cell assembly or stack 33 where the hydrogen in reformate 32 is electrochemically oxidized at an anode by air or oxygen at a cathode to produce a D.C. power output 34. The operation of the fuel processor 27, the ECO processor 29 and the fuel cell stack 33 can be controlled by a central subsystem 11 which manages the necessary air, water and heat, as well as the operation commands for each stage or step in FIG. 1.

More specifically, the fuel processor 27 converts the hydrocarbon fuel 26 to the reformate 28 through multiple steps. These steps consist of fuel reforming which includes steam reforming or partial oxidation, high temperature water-gas-shift reaction, low temperature water-gas-shift reaction, as well as reformate conditioning such as humidification and temperature control through a heat transfer process.

In the steam reforming stage, the hydrocarbon fuel 26 reacts with a water steam 12 over a reforming catalyst at an elevated temperature to form a mixture containing mainly hydrogen, carbon monoxide, carbon dioxide and others. This process is endothermic but energy efficient. In place of the steam reforming, a partial oxidation process can be used in which the hydrocarbon fuel 26 reacts with a small amount of oxygen or air 13 to form a mixture of hydrogen, carbon monoxide, carbon dioxide and others. This process is exothermic and self-sustaining but nonetheless less energy efficient.

Following the steam reforming or partial oxidation stage, the gas mixture undergoes high temperature (i.e., about 350 to 550° C.) and low temperature (i.e., about 200 to 300° C.) water-gas shift reactions in which the carbon monoxide reacts further with additional steam 12 to form hydrogen and carbon dioxide over the water-gas shift catalysts. In the present invention, the water-gas-shift reactions not only improve the overall yield of hydrogen in the fuel processor 27, it also reduces the carbon monoxide concentration to typically less than a few percent in the reformate output 28.

The above fuel reforming and water-gas shift reaction are well known in the art and described, for example, in "Heterogeneous Catalysis in Industrial Practice" by Charles N. Satterfield, Chapter 10, page 419–465, McGraw-Hill, New York, 1991, which is incorporated herein by reference.

Following the water-gas shift reaction, the reformate undergoes a conditioning process during which the humidity and temperature of the reformate output 28 is adjusted to be suitable for PEFC application. The humidity adjustment is accomplished by mixing water steam and the temperature adjustment is accomplished by thermal transfer through a heat exchanger. In a preferred operating condition, the temperature of the reformate output 28 should be in the range of about 70 to 100° C. and the humidity should be close to 100% relative humidity (RH) at the corresponding temperature.

The fuel processor 27 is preferably controlled by the central management subsystem 11 as a result of operational data 14 being transmitted therebetween. The central management subsystem 11 may control any number of operational parameters, such as a water vapor flow 12, an air flow 13, and a coolant flow 15 to the fuel processor 27. In a preferred embodiment, a single integrated electronic management subsystem 11 controls not only the fuel processor 27, but also the ECO processor 29 and the fuel cell (or fuel cell stack) 33, both of which are further described below. It is, however, envisioned to control these components with separate management subsystems.

Sensing devices (not pictured) well known in the art can be installed in the fuel processor 27, the ECO processor 29, as well as the fuel cell stack 33. These sensors monitor the overall system 10 performance by measuring the parameters which include, but are not limited to, the pressure, temperature, carbon monoxide concentration, output voltage/current, etc. This data will be part of the operational data 14, 16, 19 which will be directed to the management subsystem 11 and receive feedback from the management subsystem 11 for the control of each operation of the unit. Particularly relevant to this invention is the carbon monoxide data collected as part of each operation data 14, 16, 19. To generate the operational data with respect to carbon monoxide levels, the sensing device according to one embodiment of the present invention is a broad-band infrared absorption-detector, although other similar devices can also be used.

The humidified reformate 28 enters an anode side 36 of the ECO cell 29 (FIG. 2a) through a flow field 50 of a bipolar plate 48 (described below). It passes across an electrode catalytic material 47 which includes a catalyst metal component 41 and a catalyst support 42 further described below. Thereby, the catalytic metal component 41 chemisorbs the carbon monoxide in the reformate 28. The reference to "chemisorbs" herein is intended to refer to chemical adsorption where the electronic interaction between CO and the active site in the catalytic metal 41 occurs to form a quasi-chemical bond. Subsequent references herein to "adsorb" and "chemisorb" are used interchangeably unless otherwise specified, such as "physi-adsorption." The chemisorption of carbon monoxide occurs preferentially over hydrogen. This preferential adsorption is due to a significant difference in the Gibbs energies of adsorption between carbon monoxide and hydrogen with the catalytic sites. Consequently, the catalytic metal component 41 preferentially absorbs carbon monoxide despite the composition of the hydrocarbon reformate typically comprising far greater percentages of hydrogen.

Figure 2A:
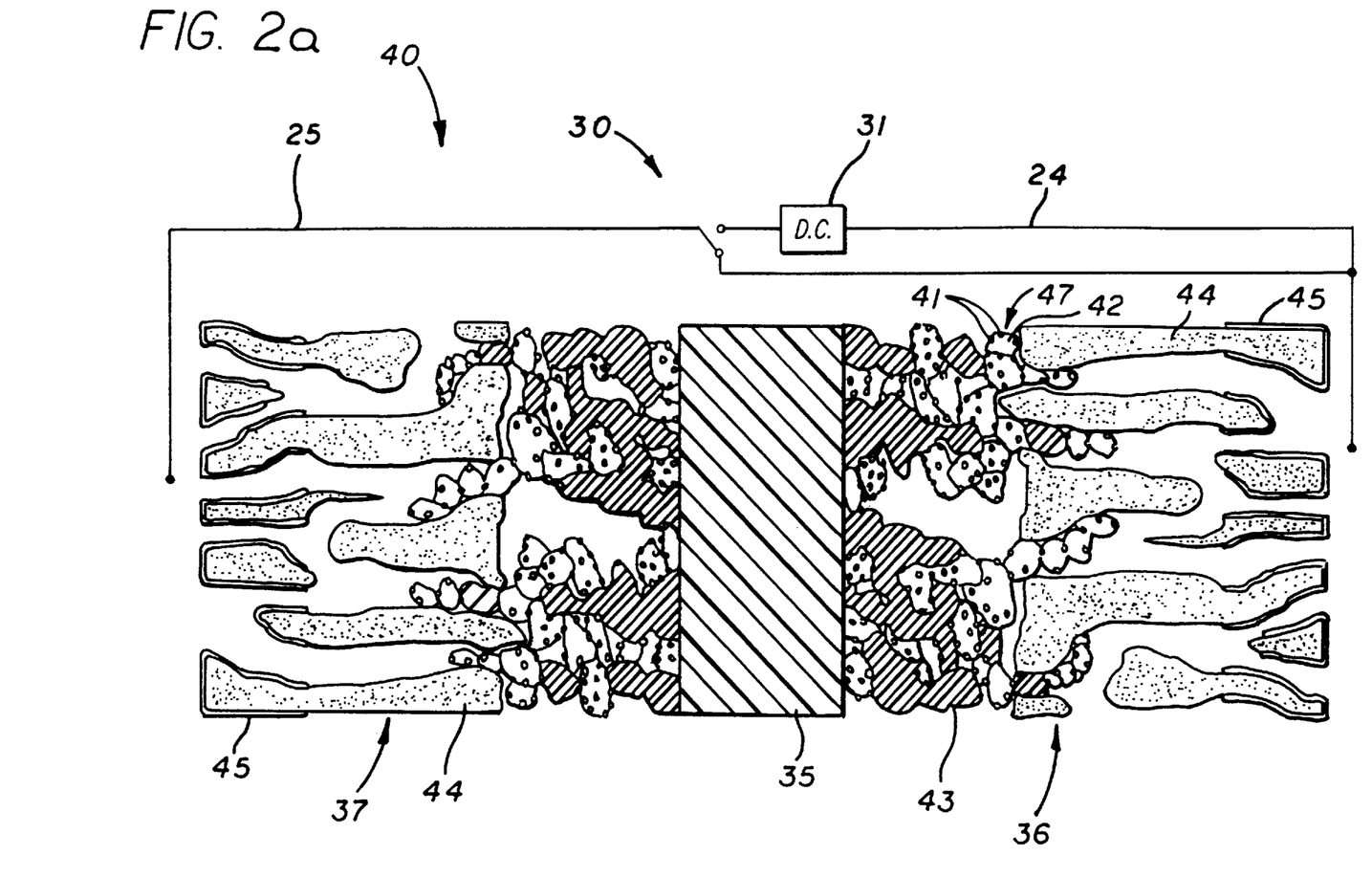
FIG. 2a depicts a membrane electrode assembly (MEA) of an electro-catalytic oxidation (ECO) processor according to one embodiment of the present invention.

Over time and in the process of adsorbing carbon monoxide, the catalytic metal component 41 eventually approaches a point of carbon monoxide saturation, thereby reducing or altogether eliminating its adsorption capacity to adsorb more carbon monoxide from the reformate 28. To maintain an efficient removal of carbon monoxide from the reformate 28, the catalytic metal component 41, and specifically its adsorption capacity, should be regenerated. The regeneration preferably occurs prior to the time the catalytic metal component 41 reaches carbon monoxide saturation and, more preferably, before there is any substantial degradation of the ability of the catalytic metal component 41 to adsorb carbon monoxide.

Regeneration can occur by removing the carbon monoxide from the catalytic metal component 41 via an oxidizing agent such as water vapor 12. Specifically, the water vapor 12 provides transient species such as a hydroxyl radical, a hydrogen peroxide radical, etc. formed during an electrochemical process (described below) when the water 12 is adsorbed over the surface of the catalytic metal 41. Thus, when an oxidizing agent from the activated water vapor 12 chemically reacts with the carbon monoxide that had been adsorbed by the catalytic metal component 41, carbon monoxide is converted to carbon dioxide that is generally not harmful to the performance of the fuel cell 33. The carbon dioxide produced from the oxidation reaction has only weak physi-adsorption (i.e., adsorption due to van der Waals interaction). Therefore, it is easily released by the catalytic metal component 41 and swept away by the continuing flow of reformate 28. With the adsorbed carbon monoxide now removed, the catalytic metal component 41 is again able to adsorb additional carbon monoxide. Accordingly, the adsorption capacity of the catalytic metal component 41 has been regenerated.

To initiate the catalytic oxidation reaction between the oxidizing agent 12 and the carbon monoxide, a current is discharged through the area containing the electrode catalytic material 47 and, specifically, the catalytic metal component 41. The current will initiate an electrochemical process which transforms the water vapor 12 adsorbed on the surface of the catalytic metal 41 to highly reactive oxidizing species. Such current discharge can occur in one of two manners. As further described below, the two manners of current discharge are referred to herein as galvanic and electrolytic. Irrespective of the manner of current discharge, during the regeneration period, the catalyzed oxidation reaction produces the carbon dioxide described above.

The present invention also includes an adsorption cycle which is distinguished from the regeneration cycle by an absence of electrical current flow and thus an absence of catalytic oxidation reactions. Preferably, a regeneration period or cycle alternates with an adsorption period or cycle as the level of carbon monoxide adsorbed to the catalyst metal component 41 rises and falls. In other words, and for example, during the adsorption cycle, the amount of adsorbed carbon monoxide rises towards the maximum adsorption capacity of the catalytic metal component 41. Before or upon the catalytic metal component 41 reaching saturation, the adsorption cycle stops and the regeneration cycle commences, during which time the amount of adsorbed carbon monoxide falls. As can be appreciated, the alternation of regeneration and adsorption can theoretically continue indefinitely.

Thus, for example, the adsorption cycle is initiated by precluding an electrical current from being developed across the area of catalytic metal component 41. But upon partial or full carbon monoxide saturation of the catalytic metal component 41, an electric current can be discharged through the area of the catalytic metal component 41 to initiate the regeneration cycle. Consequently, during the adsorption cycle, essentially no protons flow across a proton permeable membrane 35 of the ECO processor 29, as further described below. But such proton flow does occur during the regeneration cycle.

Accordingly, no hydrogen consumption takes place during the adsorption period. During the regeneration process, however, a residual amount of hydrogen chemisorbed on the surface of an anode 36 (further described below) of the ECO processor 29, as well as in the gas phase in the ECO processor 29, will participate in electrochemical oxidation reactions on the anode 36. The electrochemical oxidation of hydrogen competes with the electrochemical oxidation of carbon monoxide and water, which are adsorbed on the catalytic metal 41. The electro-oxidation of hydrogen results in the formation of protons. The protons migrate across the proton permeable membrane 35 to cathode 37 of the ECO processor 29 and react with reduced oxygen to form water. Since the electrochemical process occurring during the regeneration period is usually much faster than the cumulative adsorption process, the adsorption period generally comprises a major portion of the overall ECO operation cycle.

During both the regeneration and adsorption cycles, a substantial amount of carbon monoxide is removed from the reformate 32 exiting the ECO processor 29. However, it can be appreciated that during the adsorption cycle, the amount of carbon monoxide in the exit reformate 32 will be rising as the adsorption capacity of the catalytic metal component 41 decreases. To prevent the leakage of carbon monoxide in the exit reformate 32, the ECO processor 29 is preferably regenerated so that the adsorption capacity of catalytic metal component 41 can be restored in a timely fashion. In any event, the carbon monoxide-free reformate 32 can then enter the fuel cell stack 33, which can be of any well known design in the art. In the fuel cell stack 33, the reformate 32 can react with an oxidant, such as air 17, through an electrochemical process which produces a D.C. electrical power 34. The fuel cell byproducts that include an oxygen-depleted air 21 and a hydrogen-depleted reformate 22 can then be exhausted by the management subsystem 11 in the form of an exhaust 23.

Figure 2B:
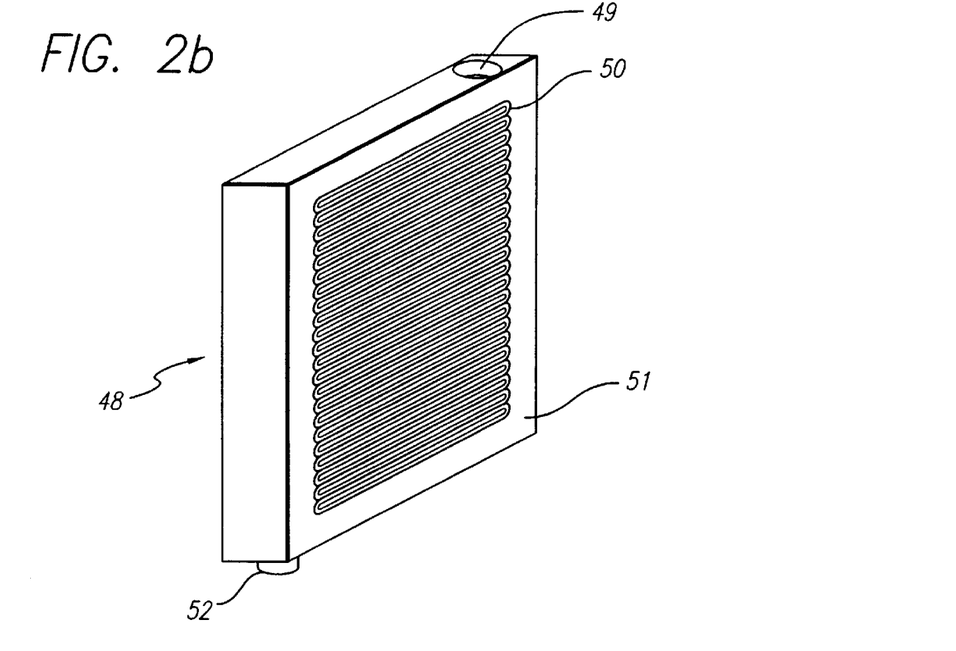

As mentioned above, FIG. 2*a* depicts the internal structure of a membrane electrode assembly of an ECO processor 29. FIG. 2*b* depicts a bipolar plate 48 that is used on both sides of the membrane electrode assembly of FIG. 2*a*. Thereby, the ECO processor 29 is generally constructed in a fashion similar to well known proton exchange membrane (PEM) fuel cells. Such PEM cells, including the construction of bipolar plates and membrane electrode assemblies, are described in the article "Polymer Electrolyte Fuel Cells" by S. Gottesfeld and T. A. Zawodzinsk in ADVANCES IN ELECTROCHEMICAL SCIENCE AND ENGINEERING, R. C. Alkire, H Gerischer, D. M Kolb and C. W. Tobias eds., Volume 5, page 195–302, Wiley-VCH, Weinheim, Germany, 1997 and incorporated herein by reference. The ECO processor 29 will be typically operated between ambient temperature to about 180° C. and at about 1 to 5 atmospheres of pressure. The ECO cell 29 includes a first portion and a second portion—namely, the anode 36 and the cathode 37—together with the proton exchange membrane 35 therebetween. Various proton permeable membrane materials which are well known in the art can be used as the proton exchange membrane 35, such as perflourinated polymers like NAFION®.

The carbon monoxide adsorption and electrochemical oxidation occurs on the anode side of the ECO device 29. The anode side consists of the anode 36 and the bipolar plate 48 with the conducting flow field 50. As shown in FIG. 2a, the electrode catalytic material 47 includes the catalyst metal component 41 dispersed over a conductive high surface area support 42. On one side of the electrode catalytic material 47, and in close contact therewith, is the proton exchange membrane 35. On the other side of the electrode catalytic material 47 is a porous conductive gas diffusion backing material 44. The backing material 44 provides reformate 28 supply to the anode 36 and can be made of conductive materials with a gas diffusion property such as carbon cloths or porous carbon papers. An example of a commercial backing material 44 is ELAT™ made by E-TEK, Inc. The side of the gas diffusion backing material 44 opposite the catalytic material 47 is in close contact with the bipolar plate 48 which is connected to a first conductive lead 24 (not shown). Through the bipolar plate 48 and the first conductive lead 24, electrons are transferred between the anode 36 and an external circuit 40. The backing material 44 can be coated with a hydrophobic coating 45 to prevent local flooding by water from the electrochemical process and from the humidified reformate 28. An example of the hydrophobic material is fluorinated ethylene propylene (FEP).

In operation, the reformate 28 containing carbon monoxide enters the ECO device 29 through an inlet 49 of the bipolar plate 48. The reformate 28 follows the flow path or feed channel 50 across a conductive surface 51 and to an outlet or exhaust 52. During the process, the reformate 28 will also pass through the gas diffusion backing material 44 and interact with the catalyst metal component 41. As it was mentioned earlier, the carbon monoxide in the reformate 28 will be selectively chemisorbed over the catalyst metal component 41. The majority of the carbon monoxide at the outlet 49 of the bipolar plate 48 is therefore being removed from the reformate 28.

To facilitate the proton transfer process during the regeneration cycle, the catalyst metal material 41 and support 42 are bound to the proton exchange membrane 35 in a matrix of proton conductive ionomer composite 43. The ionomer composite 43 is generally recasted from the perfluorinated sulfonic acid polymer particles. An example would be NAFION® particles. Alternatively, the catalyst metal material 41 and support 42 can be bound to the backing material 44 through the matrix of proton conductive ionomer composite 43 and collectively pressed against the proton exchange membrane 35 upon assembling of the ECO processor 29.

The cathode 37 is preferably of design similar to the anode 36 to insure that an oxidant such as oxygen is channeled to interact with the protons traversing the membrane 35.

The catalytic metal component 41 comprises noble and/or transition metals in a highly dispersed form upon the support 42. The support 42 is generally characterized as being electrically conductive, chemically inert, and having a high surface area. The conductivity of the support 42 may vary, but is generally comparable to that of carbon. The need for the suppport 42 to be chemically inert is to avoid reactions between the reformate 28 and the support 42 during both adsorption and regeneration cycles and to maintain the structural stability of the anode 36 during long term ECO process operation. In this embodiment, the surface area of support 42 may range from about 5 to 1500 $m^2/g$ and, more preferably, range from about 150 to 300 $m^2/g$. Some examples of suitable materials for the support 42 include carbon black, metal nitride and metal carbide such as titanium nitride, tungsten carbide, etc.

In another embodiment of this invention, the catalytic metal component 41 can be small metal crystallite powder without a supporting material 42. These metal crystallites are generally highly dispersed with particle dimensions ranging from 10 nm to >1000 nm. The benefit of using an unsupported metal crystallite is eliminating the requirement and limitation of the support 42. The unsupported metal crystallite, however, generally provides less available surface area than that of supported catalytic metal component 41.

The noble metals that are suitable for use as the catalyst metal component 41 include, but are not limited to, ruthenium, platinum, palladium, rhodium, iridium, gold, silver, etc. The useful transition metals include, but are not limited to, molybdenum, copper, nickel, manganese, cobalt, chromium, tin, tungsten, etc. The present invention contemplates that two and three noble or transition metals can be used in any combination as the catalytic metal component 41 in the form of a multiple metallic alloy. However, it is preferred that one or two noble metals and/or one or two transition metals be utilized in any form of combinations as a bimetallic alloy, which are demonstrated by the examples below.

Although the catalyst metal component 41 in the anode 36 and the cathode 37 can be the same, catalyst metal component 41 at the cathode 37 is preferably different from that at the anode 36. The preferred catalyst metal component 41 at the cathode 37 include platinum and platinum-transition metal alloys such as Pt—Co, Pt—Cr. The preferred catalyst metal component 41 at the anode 36 is ruthenium, rhodium, iridium, palladium, platinum and their corresponding transition metal alloys.

The performance of ECO processor 29 depends on the amount of catalyst metal component 41 used in the membrane electrode assembly which is normally represented by the weight of the catalyst metal per unit MEA surface area. In this invention, the preferred amount of catalyst metal component 41 for the anode 36 ranges from about 0.1 to 5 $mg/cm^2$. The preferred amount of catalyst metal component 41 for the cathode 37 ranges from about 0.1 to 5 $mg/cm^2$.

For the catalyst material 47, the amount of catalyst metal component 41 loading in the support 42 can also affect the performance of the ECO processor 29. For a noble metal based catalytic metal component 41, the metal loading over the support 42 preferably ranges from about 2 to 70 wt. %. More preferably, the loading is from about 20 to 50 wt. %.

Below about 2 wt. %, the net amount of catalyst needed for constructing the anode 36 maybe too high to fully utilize the metal in an electrochemical process where the proton transfer needs to be connected throughout the anode 36. Above 70 wt. %, it is difficult to achieve high metal dispersion which results in lower metal utilization because of the relatively lower surface metal atom to overall metal atom ratio. It is generally believed that the surface metal atoms of the catalyst metal component 41 are the active sites during a catalytic or an electro-catalytic reaction. For a transition metal based catalyst metal component 41, the metal loading preferably ranges from about 0 to 40 wt. % and, more preferably, from about 3 to 30 wt. %. Loading outside such range tends to result in similar types of performance degradation described above for noble metals.

As noted above, the catalyst metal component 41 is dispersed on the substrate 42 with a high dispersion coefficient. The dispersion coefficient is defined as the ratio of the number of surface atoms of an active catalyst metal to the total number of atoms of the metal particles in the catalyst. In this embodiment, it is preferred that the catalyst metal component 41 be characterized by a dispersion coefficient between about 5 to 100% and, more preferably, between about 30 to 90%. If below about 15%, the catalyst surface area provided by the catalyst metal component 41 can be too low to utilize the catalyst metal efficiently. The low utilization of the catalyst metal can result in a higher amount of the catalyst metal needed for the anode 36, hence leading to a higher cost of the ECO processor 29.

As mentioned above, the regeneration cycle is initiated by a discharge of electrical current through the anode 36 or cathode 37 of the ECO processor 29. Without intending to be limited by any electro-catalysis theory, it is believed that the following chemical and electrochemical processes occur during the adsorption and the regeneration cycles. During the adsorption stage, the carbon monoxide in the gas phase will chemisorb over the active site of catalyst metal component 41, designated as M, to form a chemisorbed CO species, CO/M, through the reaction:

$$CO + M \rightarrow CO/M \qquad (1)$$

Meanwhile, the hydrogen in the gas phase will also participate in a dissociative adsorption over the active site M through the reaction:

$$H_2 + 2M \rightarrow 2H/M \qquad (2)$$

Due to the significant difference in the heat of adsorption, the surface concentration of CO/M is higher than that of H/M through the cumulative adsorption of CO. The water vapor in the humidified reformate 28 will also be adsorbed over the surface of the anode 36 to form $H_2O_{ads}$. The surface on which the water adsorbs includes, but is not limited to, the surface of active site M through the following equation:

$$H_2O(gas) \rightarrow H_2O_{ads} \qquad (3)$$

During the regeneration stage, the following electro-oxidation reactions occur on the surface of the anode 36:

$$H/M \rightarrow M + H^+ + e \qquad (4)$$

and $$H_2O_{ads} \rightarrow OH_{ads} + H^+ + e \qquad (5)$$

$OH_{ads}$ is the hydroxyl group chemisorbed over the surface of the anode 36 and which is highly reactive and can oxidize the chemisorbed CO/M through the following electro-catalytic reaction:

$$CO/M + OH_{ads} \rightarrow M + CO_2 + H^+ + e \qquad (6)$$

or through the direct catalytic reaction:

$$CO/M + 2OH_{ads} \rightarrow M + CO_2 + H_2O \qquad (7)$$

Another way to express the electro-catalytic oxidation of chemisorbed carbon monoxide by water is by the following equation:

$$CO/M + H_2O_{ads} \rightarrow M + CO_2 + 2H^+ + 2e \qquad (8)$$

The carbon dioxide formed through the equations (6) to (8) has a weak interaction with the anode 36 surface and, therefore, will be swept out of the anode 36 after the regeneration.

Two approaches can be used during the regeneration cycle. They are galvanic and electrolytic methods. The manner of regeneration is controlled by the management subsystem 11. For the galvanic approach, the management subsystem 11 sends a control signal which momentarily closes a double-throw switch 30 between conductive leads 24, 25, as shown in FIG. 1. For the electrolytic approach, the management subsystem 11 sends a control signal which momentarily closes the switch 30 between conductive leads 24, 25 and a D.C. power supply 31. The leads 24, 25 are affixed (not shown) to the bipolar plates 48 at both the anode 36 and cathode 37 sides of the ECO cell 29. The conductive leads 24, 25 are preferably connected with the bipolar plates 48 which have an evenly distributed flow field configuration. One such configuration is a serpentine pattern, as is shown in FIG. 2b. The bipolar plates have uniform and close contact with the conductive backing material 44 and, therefore, with the anode 36 and cathode 37. The uniform and close contact results in an even flow of electrical current across the catalytic material 47, thereby achieving the most efficient degree of regeneration. Although a timed cycle may be used for the frequency needed for regeneration, the preferred embodiment utilizes measurements or calculations of carbon monoxide levels at the exit of fuel processor 27 and ECO processor 29 to initiate the regeneration cycle.

In the galvanic embodiment, the current is produced exclusively from a galvanic reaction owing to the transient potential difference between the anode 36 and cathode 37 side of the ECO processor 29. The circuit 40 established between the anode 36 and the cathode 37 has a very small or zero resistance. The low impedance allows an instantaneous current to pass between the anode 36 and cathode 37 when the switch 30 closes the circuit. Under such a condition, the carbon monoxide electro-oxidation reaction with water at the anode 36 to form carbon dioxide is accelerated according to the equation (8) listed above. As described above, since the carbon dioxide has a relatively weak adhesion to the anode 36 surface, it can be swept away by the reformate 28 that continues to pass through the ECO cell 29.

In the electrolytic embodiment, the above circuit 40 further comprises a separate power supply or D.C. cell 31, with voltage ranges typically from about 0.1 to 2.0 volts, which applies the external potential and current over the initial discharge of electrical current. When the switch means 30 is closed, the first conductive lead 24 from the anode 36 is operatively connected to a positive terminal of the D.C. cell 31 and the second conductive lead 25 from the cathode 37 is operatively connected to a negative terminal of the DC cell 31. Upon receiving a "reversed" potential from the power supply 31, oxidizing species will be produced as a result of reactions similar to that given in equation (5) above. The oxidizing species include but are not limited to hydroxyl groups, hydro-peroxide groups, etc. These oxidizing species can be formed over the surface of catalyst metal component 41 or other parts of the anode 36 and migrate to the catalyst metal component 41. The oxidizing species can then react with the adsorbed carbon monoxide to form carbon dioxide. Like in the galvanic embodiment above, the weakly adsorbed carbon dioxide will be stripped by the flow of reformate 28, leaving the anode 36 surface "clean."

In both galvanic and electrolytic approaches, the duration of the regeneration is also controlled by the management system 11. The regeneration duration can be greater than 0 to about 100 seconds. The preferred embodiment of the present invention is from about 0.01 second to 10 seconds.

While the above description deals with a single ECO cell 29, multiple ECO cells 29 can be used to enhance the overall CO removal capacity. These multiple ECO cells 29 can be electrically connected in a series or in a parallel pattern, similar to such well known patterns used in fuel cell stacks. Additionally, and like with fuel cells, the ECO cells 29 can be stacked in a module wherein the individual cells 29 are electrically connected in series; a plurality of modules can then be flow connected in parallel. The regeneration of multiple ECO cells 29 can occur simultaneously or in a sequential manner. However, the sequential manner is preferred. Further, the manner in which the reformate 28 flows into multiple ECO cells 29 can also be in parallel or in series, which is also similar to such flows for fuel cell stacks. The series flow pattern is preferred for more complete carbon monoxide removal.

EXAMPLES

Figure 3:
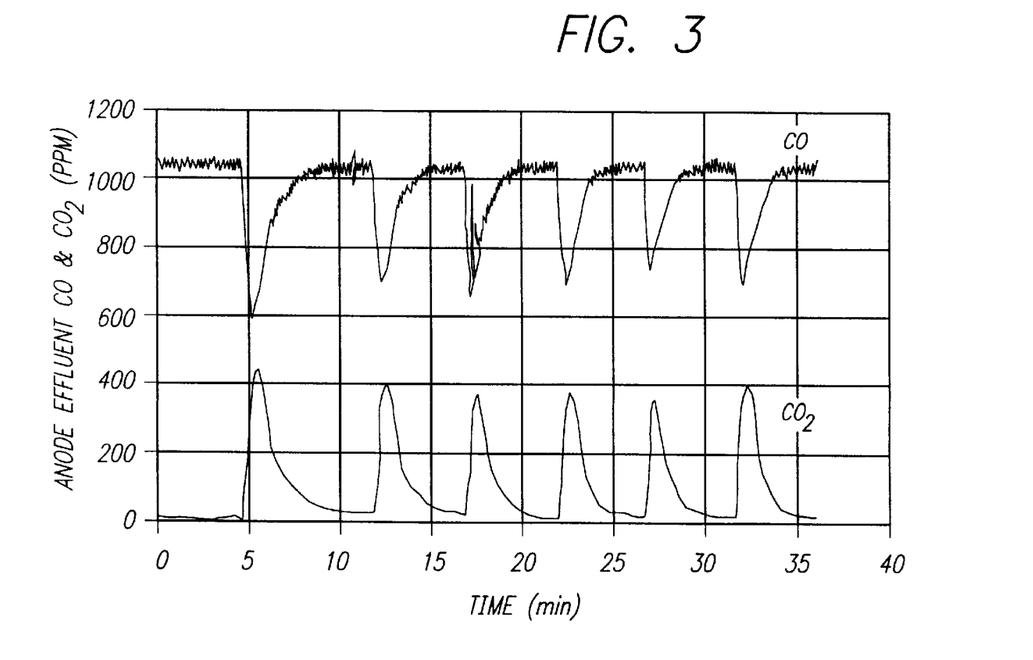
FIG. 3 is a graph of carbon monoxide and carbon dioxide concentrations at the exit of an ECO device versus time according to a first galvanic embodiment of a method of the present invention wherein carbon monoxide is present at about 1014 ppm at the inlet and the ECO processor utilizes platinum-ruthenium (Pt—Ru) as a catalyst.

FIG. 3 graphically discloses test data wherein an ECO cell was constructed with a similar configuration as a typical proton-exchange membrane (PEM) fuel cell. At the anode side of the membrane electrode assembly (MEA), a carbon supported Pt—Ru bimetallic electrode catalyst with loading of 0.299 mg/cm$^2$ was attached by the hot-pressed method described in U.S. Pat. No. 5,211,984 and incorporated herein by reference. Similarly, a Pt/C electrode catalyst with Pt loading of 0.303 mg/cm$^2$ was attached on the cathode side. The MEA had electrode surface area of 5 cm$^2$ and the ECO device was operated at 80° C. The anode gas mixture was fully humidified nitrogen containing 1014 ppm carbon monoxide. The gas mixture was introduced through the anode side of the ECO cell at a flow rate of 128 sccm. The cathode gas was fully humidified air at a flow rate of 180 sccm. Separate broad-band IR absorption-detectors were used to monitor carbon monoxide and carbon dioxide levels at the exit of the ECO cell. FIG. 3 shows that, at the beginning of the experiment, the carbon monoxide concentration within the gas mixture at the exit decreased significantly as carbon dioxide concentration increased, indicating the selective carbon monoxide adsorption and catalytic oxidation occurring over the electrode catalyst surface. Upon the saturation of carbon monoxide over the anode, gas phase carbon monoxide concentration returned to the original level. At this point, the galvanic regeneration was initiated by electrically shorting the circuit between the anode and cathode for one second to allow the electrocatalytic oxidation to occur at the anode surface. Following the short-circuiting, the carbon monoxide levels in the gas mixture decreased and the carbon dioxide increased, indicating that adsorbed carbon monoxide was oxidized to carbon dioxide and the electrode surface was cleaned for another adsorption cycle. The process was highly repeatable, as seen in FIG. 3.

Figure 4:
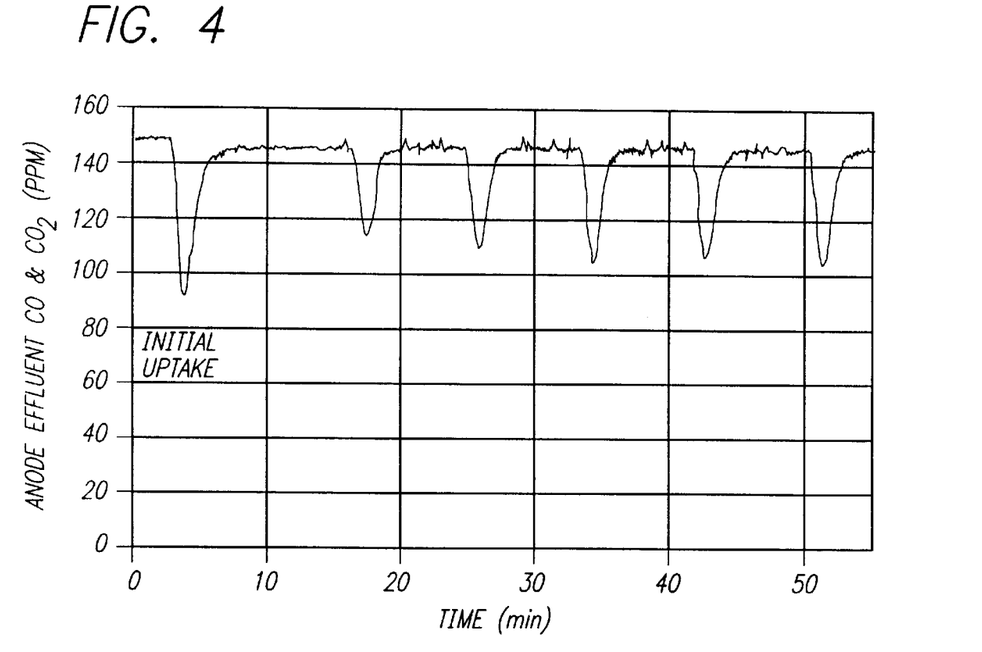
FIG. 4 is a graph of carbon monoxide concentration at the exit of an ECO device versus time according to a first electrolytic embodiment of a method of the present invention wherein carbon monoxide is present at about 120 ppm at the inlet and the ECO processor utilizes a rhodium (Rh) electrode catalyst.

FIG. 4 graphically discloses test data in an ECO device similar to that used in FIG. 3 and at an operating temperature of 80° C. At the anode side of the membrane electrode assembly, a carbon supported rhodium electrode catalyst with Rh loading of 0.270 mg/cm$^2$ was attached by the hot-pressed method. Similarly, a Pt/C electrode catalyst with Pt loading of 0.330 mg/cm$^2$ was attached on the cathode side. During the experiment, a mixture of synthetic reformate mixture containing 120 ppm CO, 19.9% $CO_2$, 37.0% $H_2$, balanced by $N_2$ was fully humidified and passed through the anode side of the ECO cell with a flow rate of 128 sccm while air at essentially 100% relative humidity was passed through the cathode side at a flow rate of 180 sccm. A broad band IR absorption detector monitored the concentration of carbon monoxide at the exit. At the beginning of the experiment, there was a significant decrease of carbon monoxide concentration in the reformate flow at the exit of the ECO cell, indicating a selective carbon monoxide absorption by the catalytic material within the anode. Upon carbon monoxide saturation of the catalytic material, gas phase carbon monoxide was observed to rise closely to its original level. At this point, the two electrodes of the ECO cell were connected to an external DC power supply with 0.4 volts, with the positive lead of the power supply attached to the anode of the ECO cell and the negative lead attached to the cathode of the ECO cell, thus producing a "reverse voltage potential." The connection lasted a short period of 1 second to initiate the electrocatalytic oxidation at the anode surface. As seen in FIG. 4, over repeated cycles, the carbon monoxide levels in the reformate were reduced through the electrocatalytic oxidation process in a manner consistent with what would be expected by the regeneration of the catalytic material absorbing the carbon monoxide.

Figure 5:
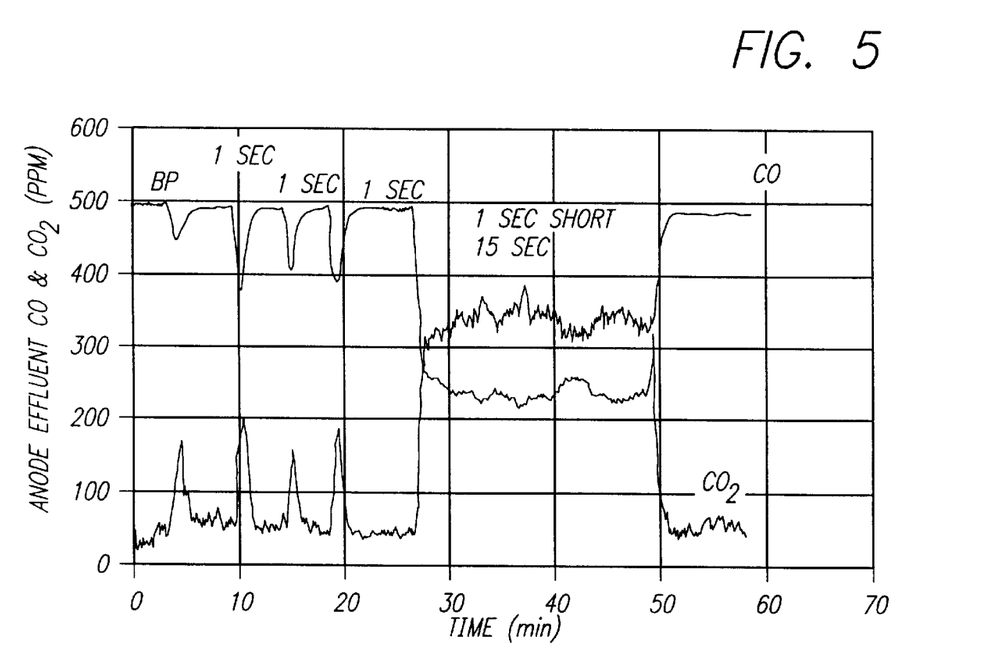
FIG. 5 is a graph of carbon monoxide and carbon dioxide concentrations at the exit of an ECO device versus time according to a second galvanic embodiment of a method of the present invention wherein the ECO processor utilizes ruthenium (Ru) as a catalyst.

FIG. 5 graphically discloses the test results of an experiment with an ECO cell similar in construction to that used in connection with FIG. 3. The anode electrode catalyst was Ru/C with the ruthenium loading at 0.3 mg/cm$^2$. The operating temperature was again 80° C. A fully humidified gas mixture containing 492 ppm carbon monoxide and the balance hydrogen was introduced into the anode side at a flow rate of 128 sccm. At the same time, 100%-humidified air was passed through the cathode side with a flow rate of 180 sccm. Separate broad band IR absorption detectors monitored carbon monoxide and carbon dioxide levels at the ECO exit. As shown in FIG. 5, at the beginning of the experiment, the carbon monoxide concentration at the exit decreased while the carbon dioxide concentration increased, indicating the selective carbon monoxide adsorption and catalytic oxidation occurred over the electrode catalyst surface. Upon the saturation of the carbon monoxide over the anode, gas phase carbon monoxide concentration returned to the original level. At this point, the two electrodes of the ECO cell were connected for one second to allow the electrocatalytic oxidation to occur at the anode surface. Following this short circuiting, depletion of carbon monoxide and enhancement of carbon dioxide in the reformate was observed, indicating that adsorbed carbon monoxide was oxidized to carbon dioxide and the electrode surface was cleaned for another adsorption cycle. The process was highly repeatable, as shown in FIG. 5. With an increase of regeneration frequency, such as one second of short circuiting for every 15 seconds of carbon monoxide adsorption, the carbon monoxide level at the exit can be maintained at a constant level, as shown in FIG. 5.

Figure 6:
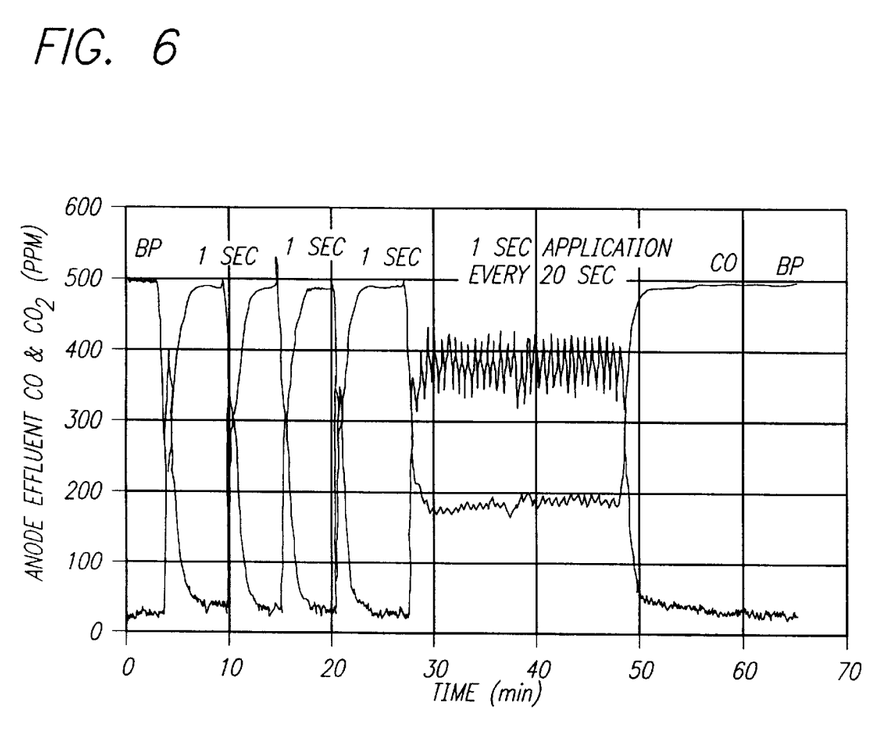
FIG. 6 is a graph of carbon monoxide and carbon dioxide concentrations at the exit of an ECO device versus time according to a first electrolytic embodiment of a method of the present invention wherein the ECO processor utilizes Ru as a catalyst.

FIG. 6 graphically discloses the test results with an ECO cell of similar construction and identical chemical concentrations, temperature and humidity as that used to obtain the test results disclosed in FIG. 5. The only distinction in the equipment producing the results in FIGS. 5 and 6 is the addition of an external DC power supply having a potential of 0.4 volts in the tests represented by FIG. 6. Upon the saturation of carbon monoxide over the anode, gas phase carbon monoxide concentration returned to the original level. At this point, the two electrodes of the ECO cell were connected to the power supply, with the positive lead of the power supply attached to the anode of the ECO cell and the negative lead attached to the cathode of the ECO cell, thus producing a "reverse voltage potential." FIG. 6 illustrates that, when the reverse voltage was applied for approximately one second, the adsorbed carbon monoxide was electrochemically oxidized to carbon dioxide, as indicated by the depletion of carbon monoxide and increase of carbon dioxide at the exit of the ECO device. This process was highly repeatable, as shown in FIG. 6. With an increase of the regeneration frequency, such as one second of applying a "reversed voltage" for every 20 seconds of carbon monoxide adsorption, the carbon monoxide level at the exit can be maintained at a constant level, as shown in FIG. 6.

As can be appreciated by those skilled in the art, the present invention provides an approach to improve fuel cell operation efficiency by removing carbon monoxide from the hydrogen fuel externally. The present invention provides advantages of a high degree of carbon monoxide removal, simple system configuration, low parasitic hydrogen consumption, increased tolerance to the dynamics of carbon monoxide output from the reformer, and ease of operation. Although a primary application of the invention is to reduce the concentration of carbon monoxide with the hydrogen fuel for fuel cell operation, the present invention can have other applications where carbon monoxide removal is necessary.

It should be understood, of course, that the foregoing relates to preferred embodiments of the invention and that modifications may be made without departing from the spirit and scope of the invention as set forth in the following claims.

We claim:

1. A method of removing carbon monoxide from a hydrocarbon reformate, said method comprising the steps of:
    moving said reformate across an electrode catalytic material in an anode electrode to preferentially adsorb said carbon monoxide with said electrode catalytic material such that an adsorption capacity of said electrode catalytic material is reduced;
    precluding said reformate from moving through a cathode electrode;
    producing an electrical current through said electrode catalytic material that has adsorbed said carbon monoxide; and
    converting said carbon monoxide that has adsorbed on said catalytic material to carbon dioxide to thereby regenerate said adsorption capacity of said electrode catalytic material by selectively producing an electrical current electrolytically or galvanically.

2. The method of claim 1, wherein the step of producing an electrical current occurs before said electrode catalytic material is saturated with said carbon monoxide.

3. The method of claim 1, wherein the step of producing an electrical current occurs when said electrode catalytic material becomes saturated with said carbon monoxide.

4. The method of claim 1, further comprising the step of flowing said reformate through a plurality of electrocatalytic processors.

5. The method of claim 4, wherein said processors are electrically connected in one of a series and a parallel pattern.

6. The method of claim 4, wherein said processors are flow connected in one of a series and a parallel pattern.

7. The method of claim 4, wherein said processors are stacked in a plurality of modules, said processors being electrically connected in series in one of said modules, and said modules being flow connected in parallel.

8. The method of claim 4, wherein the step of converting said carbon monoxide occurs sequentially in said processors.

9. A method of removing carbon monoxide from a hydrocarbon reformate, said method comprising the steps of:
    humidifying said reformate with water to thereby form a humidified reformate;
    moving said humidified reformate through an anode electrode containing a catalytic material;
    precluding said reformate from moving through a cathode electrode;
    preferentially adsorbing said carbon monoxide on said catalytic material such that an adsorption capacity of said catalytic material is reduced;
    producing an electrical current through said catalytic material that has adsorbed said carbon monoxide, said electrical current being galvanically produced, in the absence of an external power source, by an electrical circuit between said anode electrode and cathode electrode; and
    oxidizing said adsorbed carbon monoxide with said water to carbon dioxide to thereby regenerate said adsorption capacity of said catalytic material.

10. A method of removing carbon monoxide from a hydrocarbon reformate, said method comprising the steps of:
    humidifying said reformate with water to thereby form a humidified reformate;
    moving said humidified reformate through an anode electrode containing a catalytic material;
    precluding said reformate from moving through a cathode electrode;
    preferentially adsorbing said carbon monoxide on said catalytic material such that an adsorption capacity of said catalytic material is reduced;
    producing an electrical current through said catalytic material that has adsorbed said carbon monoxide, said electrical current being electrolytically produced, in the presence of an external power source, by an electrical circuit between said anode electrode and cathode electrode;
    oxidizing said adsorbed carbon monoxide with said water to carbon dioxide to thereby regenerate said adsorption capacity of said catalytic material.

11. A method of providing D.C. power from a hydrocarbon reformate containing carbon monoxide, comprising the steps of:
    humidifying said reformate with water to thereby form a humidified reformate;
    moving said humidified reformate through an anode electrode having a catalytic material that adsorbs carbon monoxide in preference to hydrogen;
    precluding said reformate from moving through a cathode electrode;
    selectively producing an electrical current electrolytically or galvanically through said catalytic material to thereby oxidize said adsorbed carbon monoxide with said water to carbon dioxide;

producing a substantially carbon monoxide free reformate;

passing said carbon monoxide free reformate into a fuel cell to produce said D.C. power.

12. The method of claim 11, further comprising the step of regenerating an adsorption capacity of said catalytic material.

13. The method of claim 11, wherein the step of producing an electrical current occurs cyclically over time.

14. An electrocatalytic oxidation processor for removing carbon monoxide within a hydrocarbon reformate, said electrocatylatic oxidation processor comprising:

a pair of bipolar plates;

a first portion containing a catalytic material which preferentially adsorbs with said carbon monoxide, said first portion being disposed intermediate said bipolar plates;

a second portion separated from said first portion by a proton permeable membrane, said second portion being disposed intermediate said bipolar plates; and an electrical circuit comprising a first conductive lead electrically connected to said first portion and a second conductive lead electrically connected to said second portion.

15. The processor of claim 14, wherein said electrical circuit further comprises a switch electrically connected in series with said first and second leads such that when said switch is changed from an open state to a closed state, electrical continuity is established between said first portion and said second portion.

16. The processor of claim 14, further comprising a power source connected to said electrical circuit.

17. The processor of claim 14, wherein said first portion comprises a first catalytic material and said second portion comprises a second catalytic material.

18. The processor of claim 14, wherein said catalytic material comprises a metal component.

19. The processor of claim 18, wherein said catalytic material further comprises a support on which said metal component is disposed.

20. The processor of claim 19, wherein said support is characterized by a surface area between about 5 to 1500 $m^2/g$.

21. The processor of claim 14, wherein said catalytic material is characterized by a dispersion coefficient between about 5 to 100%.

22. An electrocatalytic oxidation system for reducing a carbon monoxide concentration within a hydrocarbon reformate, said electrocatylatic oxidation system comprising:

a plurality of electrocatalytic processors, at least one of said processors comprising:
an anode that receives said reformate;
a cathode that receives an oxygen containing gas in the absence of said reformate;
a proton permeable membrane operatively disposed between said anode and cathode; and
an electrical circuit between said anode and cathode, said electrical circuit selectively producing an electrical current by one of a galvanic reaction and an electrolytic reaction.

23. The system of claim 22, wherein said electrical circuit further comprises a switch, which when changed from an open to a closed state, completes said electrical circuit.

24. The system of claim 22, further comprising a D.C. power source in communication with said electrical circuit.

25. The system of claim 22, wherein said anode comprises a first catalytic material and said cathode comprises a second catalytic material.

26. The system of claim 25, wherein said first and second catalytic materials comprise a metal component selected from a group consisting of noble metals, transitional metals, and mixtures thereof.

27. The system of claim 25, wherein said first and second catalytic materials comprise a support made of an electrically conductive medium.

28. The system of claim 27, wherein said support is selected from the group consisting of carbon black, titanium nitride, titanium aluminum nitride, and tungsten carbide.

29. The system of claim 27, wherein said metal component is characterized by a loading in said support between about 2 to 70 wt. %.

30. The system of claim 27, wherein said metal component is present at about 0.1 to 5.0 $mg/cm^2$.

31. The system of claim 22, wherein said processors are electrically connected in one of a series and parallel pattern.

32. The system of claim 22, wherein said processors are flow connected in one of a series and parallel pattern.

33. The system of claim 22, wherein said processors are stacked in a plurality of modules, said processors being electrically connected in series in one of said modules, and said modules being flow connected in parallel.

34. The system of claim 22, wherein the step of converting said carbon monoxide occurs sequentially in said processors.

35. A carbon monoxide removal system, comprising:

a fuel processor that processes a hydrocarbon fuel containing carbon monoxide and water;

an electrocatalytic oxidation processor downstream of said fuel processor, said oxidation processor comprising:
an anode electrode with a catalytic material having a support and a metal component, said catalytic material being capable of adsorbing said carbon monoxide preferentially over hydrogen in said hydrocarbon fuel; and
cathode electrode that receives an oxygen containing gas in the absence of said fuel; and
an electrical circuit that selectively produces an electrical current electrolytically or galvanically through said catalytic material to oxidize said adsorbed carbon monoxide with said water to carbon dioxide.

36. The system of claim 35, further comprising an electronic management system in communication with said fuel processor, oxidation processor, and electrical circuit.

* * * * *